US010584752B2

(12) United States Patent
Akanuma et al.

(10) Patent No.: US 10,584,752 B2
(45) Date of Patent: Mar. 10, 2020

(54) BALL ARRANGING METHOD AND DEVICE FOR BALL BEARING, AND BALL BEARING MANUFACTURED BY SAID BALL ARRANGING METHOD

(71) Applicant: NSK LTD., Tokyo (JP)

(72) Inventors: Norihito Akanuma, Konan (JP); Hiroshi Araki, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/510,406

(22) PCT Filed: Sep. 11, 2015

(86) PCT No.: PCT/JP2015/075784
§ 371 (c)(1),
(2) Date: Jul. 5, 2017

(87) PCT Pub. No.: WO2016/039435
PCT Pub. Date: Mar. 17, 2016

(65) Prior Publication Data
US 2017/0314622 A1 Nov. 2, 2017

(30) Foreign Application Priority Data

Sep. 12, 2014 (JP) .................................. 2014-186214

(51) Int. Cl.
*B23P 21/00* (2006.01)
*F16C 43/04* (2006.01)
(Continued)

(52) U.S. Cl.
CPC ............ *F16C 43/06* (2013.01); *B23P 15/003* (2013.01); *B23P 19/04* (2013.01); *B23P 21/00* (2013.01);
(Continued)

(58) Field of Classification Search
CPC .......... F16C 43/06; F16C 19/08; F16C 43/04; F16C 19/06; B25J 9/1697; B25J 9/1687;
(Continued)

(56) References Cited

U.S. PATENT DOCUMENTS 1,035,463 A * 8/1912 Oldfield ................... F16C 43/06
384/508
4,815,190 A * 3/1989 Haba, Jr. ................ B23P 21/004
198/346.1

(Continued)

FOREIGN PATENT DOCUMENTS

CN    201526615 U    7/2010
CN    202545601 U    11/2012
(Continued)

OTHER PUBLICATIONS

Communication dated Nov. 7, 2017 by the Japanese Patent Office in a counterpart Japanese Patent Application No. 2014-186214.
(Continued)

*Primary Examiner* — David P Bryant
*Assistant Examiner* — Lawrence Averick
(74) *Attorney, Agent, or Firm* — Sughrue Mion, PLLC

(57) ABSTRACT

A plurality of balls inserted in the gap space between an outer ring raceway surface and an inner ring raceway surface are arranged at equally spaced intervals in a circumferential direction. The procedure of this ball arranging method for a ball bearing includes a ball holding step of holding any ball in the gap space by a ball holding mechanism provided at a tip of a robot arm and a ball moving step of moving the ball held by the ball holding mechanism along a pitch circle, and these steps are repeatedly performed for the plurality of balls based on a control program. Accordingly, the plurality of balls are arranged at equally spaced intervals on the pitch circle.

12 Claims, 18 Drawing Sheets

(51) Int. Cl.
*F16C 43/06* (2006.01)
*F16C 19/08* (2006.01)
*F16C 19/06* (2006.01)
*F16C 19/16* (2006.01)
*B23P 15/00* (2006.01)
*B23P 19/04* (2006.01)
*B25J 9/16* (2006.01)

(52) U.S. Cl.
CPC .......... *B25J 9/1687* (2013.01); *B25J 9/1697* (2013.01); *F16C 19/06* (2013.01); *F16C 19/08* (2013.01); *F16C 19/16* (2013.01); *F16C 2322/59* (2013.01)

(58) Field of Classification Search
CPC .............. B23P 21/00; Y10T 29/49634; Y10T 29/49647; Y10T 29/4968; Y10T 29/49682; Y10T 29/49643
See application file for complete search history.

(56) References Cited

U.S. PATENT DOCUMENTS

| | | | | |
|---|---|---|---|---|
| 5,421,088 | A * | 6/1995 | Kawamura | ............ F16C 43/06 29/898.062 |
| 7,406,768 | B2 * | 8/2008 | Ikeda | .................... F16C 41/001 192/110 B |
| 2006/0112561 | A1 * | 6/2006 | Chiba | .................. B23P 19/001 29/898.04 |
| 2010/0063629 | A1 * | 3/2010 | Battisti | ................. B25J 9/1679 700/259 |
| 2010/0098366 | A1 * | 4/2010 | Sato | .................... F16C 33/3887 384/530 |
| 2012/0292367 | A1 | 11/2012 | Morgan et al. | |
| 2015/0308503 | A1 * | 10/2015 | Fehr | ...................... F16C 33/585 384/513 |
| 2017/0363148 | A1 * | 12/2017 | Akanuma | ............. F16C 43/065 |

FOREIGN PATENT DOCUMENTS

| | | | |
|---|---|---|---|
| EP | 2 940 332 A1 | 4/2015 | |
| JP | 03213229 A1 * | 9/1991 | ............. B23P 21/00 |
| JP | 4-217437 A | 8/1992 | |
| JP | 5-104361 A | 4/1993 | |
| JP | 3213229 B2 | 7/2001 | |
| JP | 2002-219623 A | 8/2002 | |
| JP | 2007-78043 A | 3/2007 | |
| JP | 2008-200789 A | 9/2008 | |
| JP | 4217437 B2 | 11/2008 | |
| WO | 2014/103899 A1 | 7/2014 | |

OTHER PUBLICATIONS

Communication dated Jun. 4, 2018, from the State Intellectual Property Office of People's Republic of China in counterpart Application No. 201580061780.3.

Communication dated Apr. 2, 2018, issued by the Korean Intellectual Property Office in counterpart Korean application No. 10-2017-7009889.

Communication dated Aug. 1, 2018, issued by the European Patent Office in counterpart European Application No. 15839574.9.

* cited by examiner

FIG.17A    FIG.17B    FIG.17C
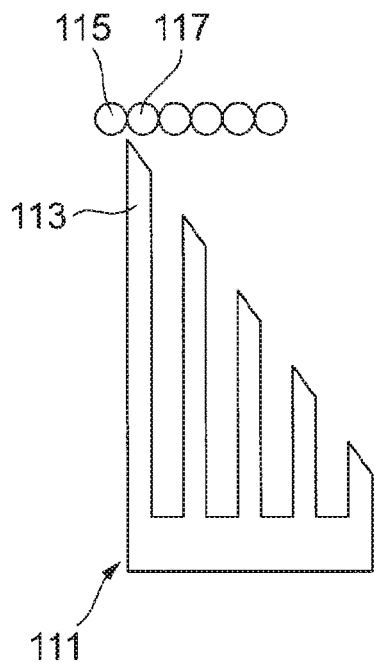 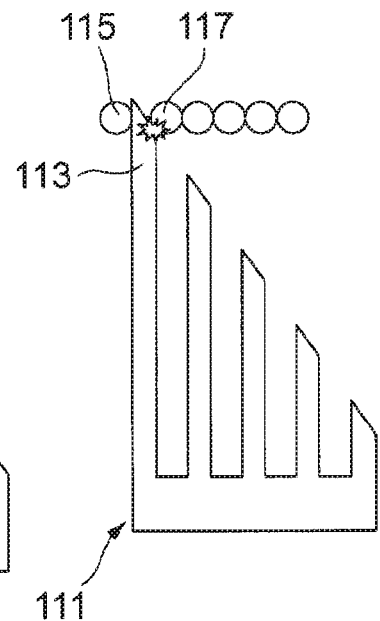 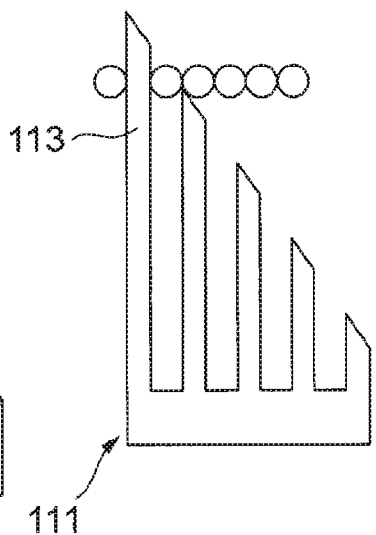
FIG.17D    FIG.17E
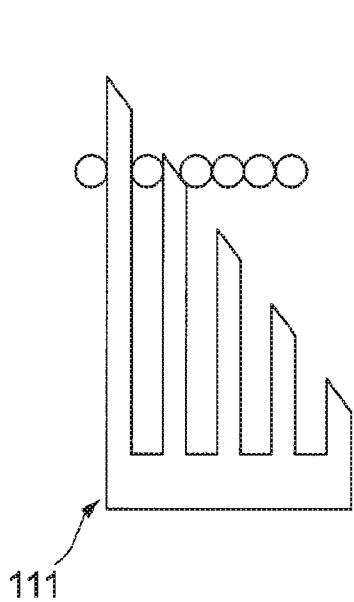 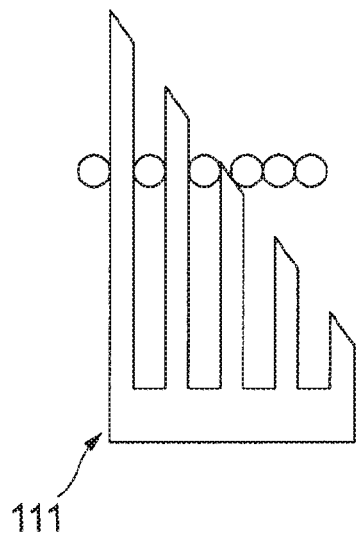

BALL ARRANGING METHOD AND DEVICE FOR BALL BEARING, AND BALL BEARING MANUFACTURED BY SAID BALL ARRANGING METHOD

TECHNICAL FIELD

The present invention relates to a ball arranging method and a ball arranging device for a ball bearing, and a ball bearing produced by the ball arranging method.

BACKGROUND ART

A ball bearing assembly process includes a ball arranging process of inserting balls into a gap space between an outer ring and an inner ring and then arranging the inserted balls at equally spaced intervals. As the ball arranging process, four following methods may be exemplified, for example.

(1) Manual: The balls are moved by using a bamboo skewer or the like. Since the ball is positioned with eyes, it is difficult to correctly distribute the balls at equally spaced intervals.

(2) Ball distribution arrow: As disclosed in Patent Document 1, the balls are arranged at equally spaced intervals by inserting a comb-shaped ball distribution jig, which has a plurality of operation arrows having different axial lengths and protruding along a ball pitch circle of a ball bearing, into a gap area between the inner and outer rings. First of all, a ball gathering operation of gathering the plurality of balls to one area in a circumferential direction should be performed. Also, when the number of balls increases, it is necessary to lengthen an axial length of a ball distribution arrow 111 as shown in FIG. 16. In this case, the ball distribution arrow is difficult to be manufactured and is expensive.

(3) Air ball distribution: As disclosed in Patent Document 2, the balls are arranged at equally spaced intervals by air injection and suction. The ball gathering is not required. However, an expensive nozzle for air injection and suction is required.

(4) Magnetic ball distribution: As disclosed in Patent Document 3, the balls are arranged at equally spaced intervals by bringing a magnet close to a raceway surface space between the inner and outer rings to apply a magnetic field to the raceway surface space and thus generating magnetic repulsive forces between the respective adjacent balls. The ball gathering is not required but a strong magnet is required.

Among the above methods, the air ball distribution and the magnetic ball distribution are not generally used because the expensive dedicated jig and tool are required. At present, the ball distribution arrow method is adopted as an automatic ball distribution method which is relatively inexpensive and is suitable for the mass production.

PRIOR ART DOCUMENTS

Patent Documents

Patent Document 1: JP-A-2008-200789
Patent Document 2: JP-A-H5-104361
Patent Document 3: JP-A-2007-78043

SUMMARY OF THE INVENTION

Problems to be Solved by the Invention

However, even in the process of equally distributing the balls by the ball distribution arrow method, a ball damage, a ball distribution error and a problem resulting from the ball distribution arrow are caused.

(I) Ball Damage

Upon the ball distribution by the ball distribution arrow, when pressing the ball with an inclined surface of an arrow, a surface of the ball may be damaged and dust and foreign matter may be attached to the ball. In particular, in the case of a bearing number having a large number of balls, like a thin bearing, since the ball distribution arrow moves the balls with pressing the same at an initial stage of the ball distribution, it is necessary to press the ball distribution arrow with high force. As a result, the ball is strongly rubbed with the inclined surface of the ball, so that the ball is likely to be damaged. FIGS. 17A to 17E show a manner of the ball distribution by the ball distribution arrow 111. From a preparatory state of FIG. 17A, when a tip end arrow 113 is inserted between a first ball 115 closest to an end portion and a second ball 117, as shown in FIG. 17B, an inclined surface of the tip end arrow 113 presses all the second and subsequent balls. For this reason, the tip end arrow 113 rubs the second ball 117 with higher force. Then, as shown in FIGS. 17C to 17E, as the ball distribution is progressed, the number of balls to be pressed by the arrows decreases. Therefore, the ball is most likely to be damaged at the initial stage of the ball distribution.

(II) Ball Distribution Error

For example, when the moving speed of the ball distribution arrow 111 is increased so as to shorten a production cycle time of the bearing, when a resistance upon movement of the ball row by the ball distribution arrow 111 is decreased depending on an amount of rust-proofing oil (dry state) attached to a bearing ring or the ball, or the like, the moving speed of the ball may be excessively increased. In this case, a deviation occurs between the rising timing of the ball distribution arrow and the ball position. From a preparatory state of FIG. 18A, when the second and subsequent balls are pushed, as shown in FIG. 18B, the second and subsequent balls go ahead, as shown in FIG. 18C. As a result, the ball distribution arrow 111 and the ball collide with each other, so that a ball distribution error is caused. Due to this problem, the moving speed of the ball distribution arrow 111 has an upper limit. Therefore, it is difficult to further shorten the cycle time.

(III) Change in Occurrence Ratios of Ball Distribution Error and Ball Damage Depending on Number of Balls The ball distribution error and the ball damage due to the ball distribution arrow tend to increase as the number of balls increases.

TABLE 1

| | Number of balls | | | | | |
|---|---|---|---|---|---|---|
| | 3 to 8 | 9 to 12 | 13 to 16 | 17 to 19 | 20 to 24 | 25 or more |
| Ball damage | A | A | B | B | C | C |
| Ball distribution error | A | A | A | B | C | D |

A: little occurred (occurrence ratio: 0.1% or less)
B: rarely occurred (occurrence ratio: 0.1% to 0.3%)
C: regularly occurred (occurrence ratio: 0.3% to 1.0%)
D: frequently occurred (occurrence ratio: 1.0% or greater)

(IV) Cost and Damage of Ball Distribution Arrow

The ball distribution arrow is a component required to have surface hardness capable of bearing friction and high dimensional precision, and the processing cost thereof is high. Further, the ball distribution arrow is a dedicated component required for each bearing number, so that many types of the ball distribution arrows are required. Also, when the ball distribution error as described above occurs, since the ball distribution arrow may be damaged, it is necessary to prepare a spare component all the time, which increases the production cost of the bearing. In particular, when manufacturing a ball distribution arrow suitable for a bearing number having a large number of balls, each arrow is elongated, so that strength of the arrow is lowered and the arrow is thus likely to be broken.

The present invention has been made in view of the above circumstances, and an object thereof is to provide a ball arranging method and a ball arranging device for a ball bearing capable of preventing a ball damage and a ball distribution error and saving the production cost without using an expensive jig, and a ball bearing to be produced by the ball arranging method.

Means for Solving Problems

The present invention is configured as follows.

(1) A ball arranging method for a ball bearing to arrange a plurality of balls inserted in a gap space between an outer ring raceway surface and an inner ring raceway surface at equally spaced intervals along a ball pitch circle, wherein:

a ball holding step of holding any ball of the plurality of balls in the gap space by a ball holding mechanism arranged at a tip of a robot arm, and a ball moving step of moving the ball held by the ball holding mechanism along the pitch circle by driving the robot arm are repeatedly performed based on a control program such that the plurality of balls are arranged at equally spaced target arrangement positions.

(2) The ball arranging method of (1), wherein before performing the ball holding step and the ball moving step, a ball gathering step of causing the plurality of balls to contact each other along the pitch circle to form a ball row is performed.

(3) The ball arranging method of (2), wherein one of the plurality of balls is set as a non-movable ball which is not moved, and balls other than the non-movable ball are moved along the pitch circle.

(4) The ball arranging method of (2) or (3), wherein the ball row is divided into two blocks, balls in one block are moved in a clockwise direction and balls in the other block are moved in a counterclockwise direction.

wherein the ball bearing has 20 or more balls.

(5) The ball arranging method of one of (1) to (4), wherein the ball bearing is a double-row ball bearing including a first ball row and a second ball row, and wherein a ball of the first ball row and a ball of the second ball row which overlaps with each other in an axial direction are held by the ball holding mechanism at the same time to be moved along the pitch circle.

(6) A ball arranging device for a ball bearing to arrange a plurality of balls inserted in a gap space between an outer ring raceway surface and an inner ring raceway surface of the ball bearing at equally spaced intervals along a ball pitch circle, the device comprising:

a bearing support unit which supports the ball bearing;

a ball holding mechanism which releasably holds any ball in the gap space;

a robot arm which includes a tip arranged with the ball holding mechanism; and a control unit which drives the robot arm and the ball holding mechanism based on a control program, wherein the control unit controls the ball holding mechanism to hold any ball in the gap space and controls the robot arm to move the held ball to equally spaced target arrangement positions.

(7) The ball arranging device of (6), wherein the ball holding mechanism includes a pair of plate members arranged in parallel with a gap substantially same width as a diameter of the ball and sandwich the ball by the pair of plate members.

(8) The ball arranging device of (7), wherein the ball bearing is a double-row ball bearing including a first ball row and a second ball row, and wherein the pair of plate members has a length at least larger than an axial length between center positions of a ball of the first ball row and a ball of the second ball row which overlap in an axial direction.

(9) A ball bearing produced by the method of one of (1) to (5).

Effects of the Invention

According to the ball arranging method and the ball arranging device for the ball bearing of the present invention, the plurality of balls inserted in the gap space between the outer ring raceway surface and the inner ring raceway surface are moved and arranged at equally spaced intervals by the robot arm based on the control program prepared in advance. For this reason, even when a kind of the ball bearing, which is a target, is changed, it is possible to simply perform the set changing in a short time just by changing the control program. Therefore, it is possible to prevent the ball damage and the ball distribution error without using a dedicated jig, to reduce the takt time and to save the production cost of the bearing.

Also, the ball bearing of the present invention becomes a stable product of high grade produced at low cost and the product performance is more constant.

BRIEF DESCRIPTION OF THE DRAWINGS

FIGS. 2A and 2B are configuration views of a claw-shaped jig of a ball holding mechanism, in which FIG. 2A is a front view of the claw-shaped jig and FIG. 2B is a side view of the claw-shaped jig.

FIGS. 17A to 17E show a manner of ball distribution by the ball distribution arrow.

DETAILED DESCRIPTION OF EMBODIMENT

Hereinafter, embodiments of the present invention will be described in detail with reference to the drawings.

Figure 1:
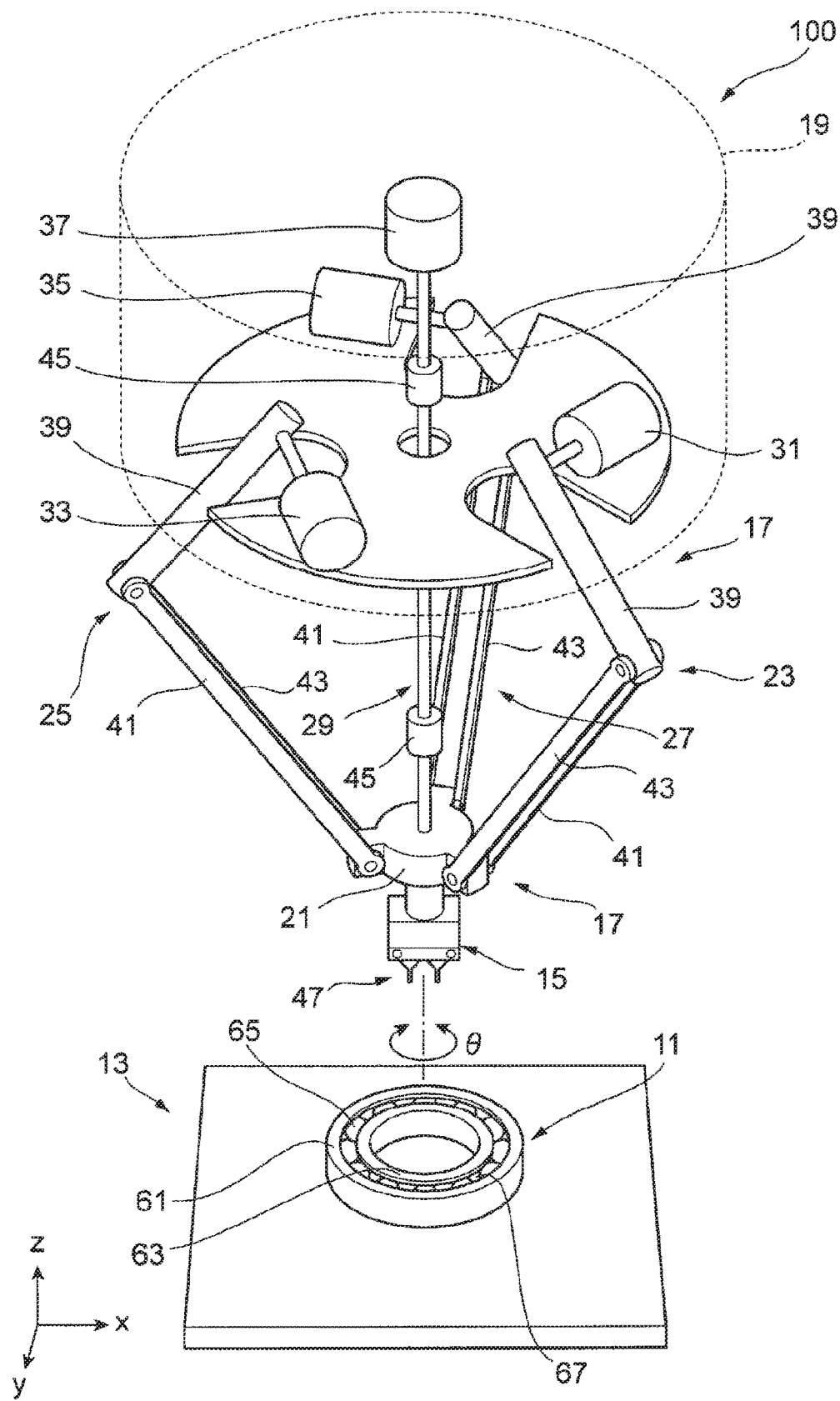
FIG. 1 is an overall configuration view schematically showing a ball arranging device for a ball bearing according to an embodiment of the present invention.

FIG. 1 is an overall configuration view schematically showing a ball arranging device for a ball bearing according to an embodiment of the present invention. A ball arranging device 100 for a ball bearing arranges a plurality of balls inserted in a gap space between an outer ring raceway surface and an inner ring raceway surface at equally spaced intervals in a circumferential direction along a pitch circle. The ball arranging device 100 includes a bearing support unit 13 which supports a ball bearing 11, a ball holding mechanism 15 which releasably holds any one ball in the gap space of the ball bearing 11, a robot arm 17 having the ball holding mechanism 15 provided at a tip end portion thereof, and a control unit (not shown) (which will be described later) which drives the robot arm 17 based on a control program prepared in advance.

In the shown example, the robot arm 17 is a parallel link type robot. The robot arm 17 mainly includes a base part 19, a movable plate 21 to which the ball holding mechanism 15 is connected, three link parts 23, 25, 27 which couple the movable plate 21 and the base part 19, and a rotary shaft part 29 which rotatably drives the ball holding mechanism 15.

The base part 19 accommodates therein motors 31, 33, 35 which drive the link parts 23, 25, 27 and a motor 37 which drives the rotary shaft part 29, and is arranged above the movable plate 21.

The link part 23 includes a driving-side link member 39 and two passive-side link members 41, 43. The driving-side link member 39 has one end portion connected to the motor 31 arranged in the base part 19 and the other end portion connected to the passive-side link members 41, 43. The passive-side link members 41, 43 have one end portions connected to the driving-side link member 39 and the other opposite end portions connected to the movable plate 21. The link part 23 is driven by the motor 31, thereby displacing the movable plate 21.

Each of the other link parts 25, 27 also has the driving-side link member 39 and the passive-side link members 41, 43 coupled to the link part, and is driven by each of the motors 33, 35. The movable plate 21 is displaced in x, y and z axis directions of FIG. 1 as the respective link parts 23, 25, 27 are driven by the motors 31, 33, 35.

The ball holding mechanism 15 connected to the movable plate 21 is supported to the movable plate 21 such that it can be rotatably driven about a θ axis of FIG. 1 integrally with rotation of the rotary shaft part 29. The rotary shaft part 29 has a tip end portion connected to the ball holding mechanism 15 and a base end portion connected to the motor 37.

A part of the rotary shaft part 29 between the ball holding mechanism 15 and the motor 37 is provided with universal joints 45, 45 and a spline engagement part (not shown) which is freely stretchable in an axial direction to absorb displacement and expansion and contraction of the rotary shaft part 29 caused as the movable plate 21 is moved.

Figure 2A:
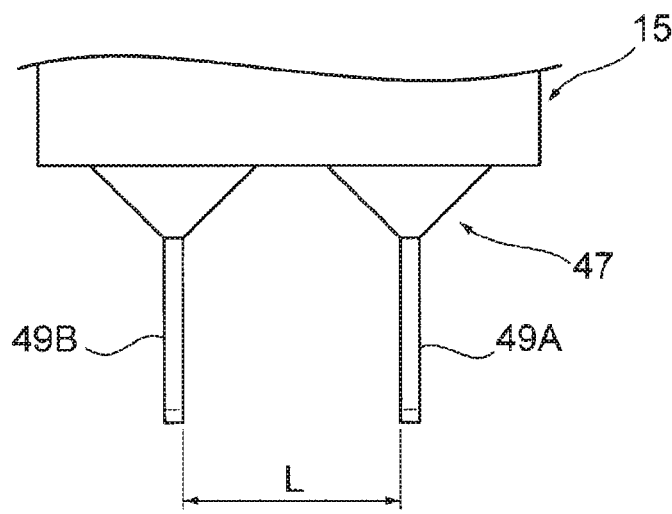
Figure 2B:
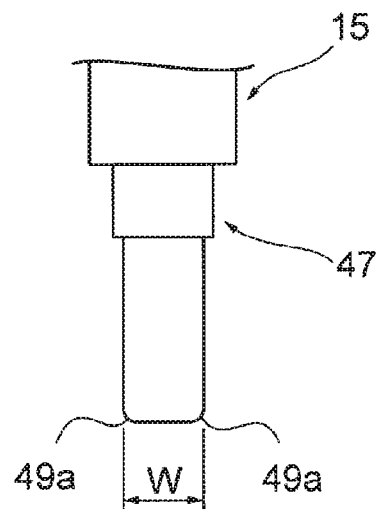

FIGS. 2A and 2B are configuration views of a claw-shaped jig 47 of the ball holding mechanism 15, in which FIG. 2A is a front view of the claw-shaped jig 47 and FIG. 2B is a side view of the claw-shaped jig 47. As shown in FIG. 2A, the claw-shaped jig 47 includes a pair of plate members 49A, 49B arranged in parallel with an interval L equal to or slightly greater than a diameter of a ball of the ball bearing 11. The interval L between the pair of plate members 49A, 49B is preferably set to a length corresponding to a sum of the diameter of the ball and a slight gap size. Also, as shown in FIG. 2B, the pair of plate members 49A, 49B has a width W which can be inserted into the gap space between the inner ring and the outer ring of the ball bearing 11, respectively. Tip end corner portions 49a of the plate members 49A, 49B are chamfered in a smooth curve shape such that the raceway surfaces and the balls of the ball bearing 11 are prevented from being damaged.

Figure 3:
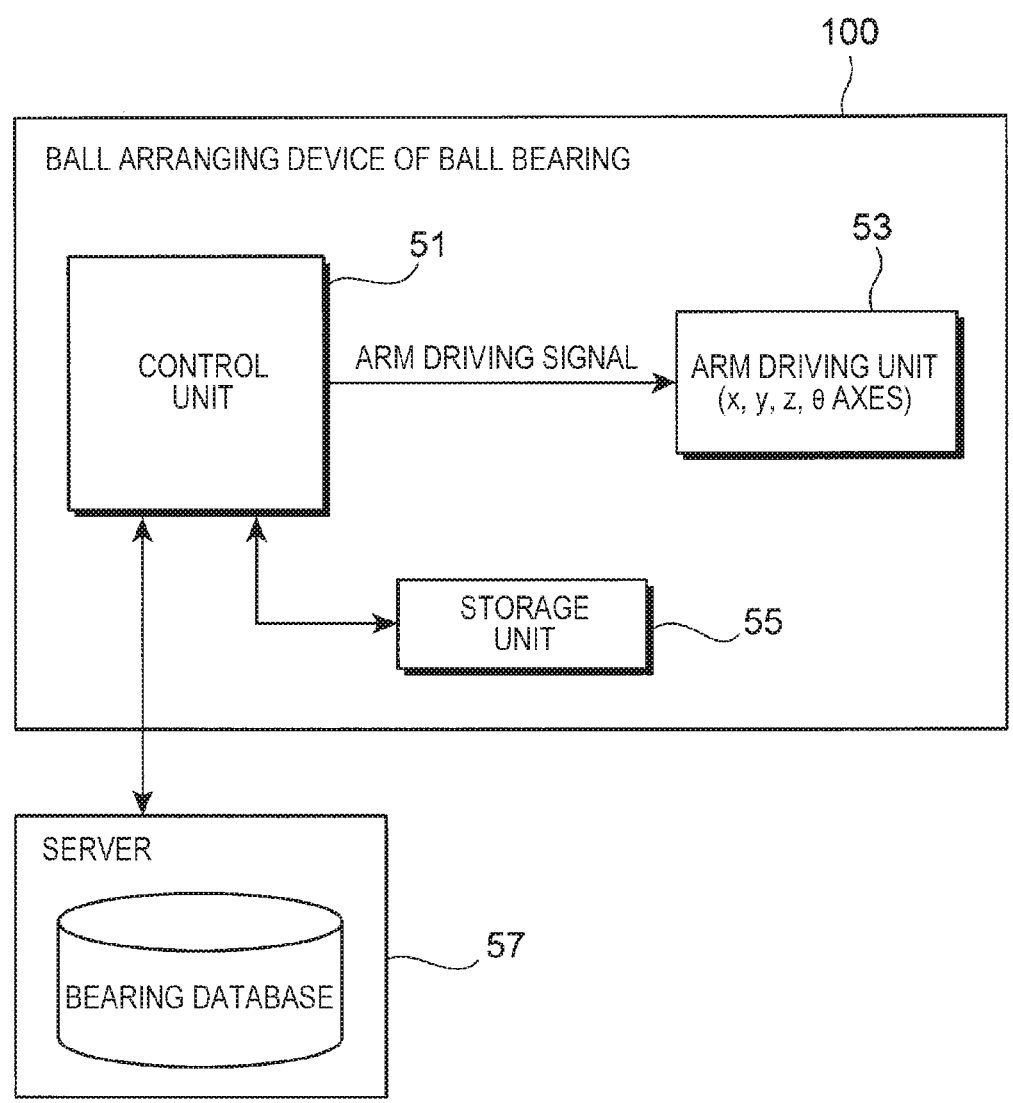
FIG. 3 is a control block diagram of the ball arranging device for the ball bearing.

FIG. 3 shows a control block diagram of the ball arranging device 100 for the ball bearing. The ball arranging device 100 for the ball bearing includes a control unit 51, an arm driving unit 53, and a storage unit 55 in which a control program for executing each process of a ball distribution sequence (which will be described later) is stored. The ball arranging device 100 for the ball bearing is connected to a server 50 having a bearing database of a variety of specification information including a size of a bearing, the number of balls and the like set for each bearing number.

The server 57 outputs information of a program number, which corresponds to a bearing number of the ball bearing which is a ball distribution target, to the control unit 51. The control unit 51 selectively executes a control program designated from a plurality of control programs prepared in advance in the storage unit 55, based on the information of the program number input from the server 57. Also, the control unit 51 may inquire the server 50 about a variety of specification information of the ball bearing and use the obtained information for execution of the control program, as necessary.

The control unit 51 is a computer device (information processing device) including a CPU, a memory, an I/O interface and the like, such as a personal computer and a programmable controller, and the storage unit 55 is a storage means configured by a variety of recording media such as a hard disk drive, a memory and the like.

The arm driving unit 53 drives each actuator (the motors 31, 33, 35, 37) of the robot arm 17, based on an arm driving signal output from the control unit 51, and inserts the claw-shaped jig 47 of the ball holding mechanism 15 into the gap space between the inner and outer rings of the ball bearing so as to change a position of the ball.

The ball arranging device 100 for the ball bearing having the above configuration equally arranges the balls along the pitch circle by a ball arranging method, which will be described in detail later. In the ball arranging method, a ball distribution sequence includes a ball holding step of holding any ball of the plurality of balls in the gap space by the ball holding mechanism 15 arranged at the tip of the robot arm 17 and a ball moving step of moving the ball 65 held by the ball holding mechanism 15 along the pitch circle by driving the robot arm 17. The respective steps are performed based on the control programs prepared in advance.

Meanwhile, in the ball arranging method, before performing the ball distribution sequence, a ball gathering sequence of causing the plurality of balls to contact each other along the pitch circle to form a ball row is performed. The ball gathering sequence is performed, so that it is possible to correctly recognize a position of each ball.

<Ball Gathering Sequence>

Subsequently, the ball gathering sequence which is to be executed by the ball arranging device 100 for the ball bearing having the above configuration is described.

FIGS. 4A to 4D are plan views of the ball bearing 11, showing the ball gathering sequence in each step.

Figure 4A:
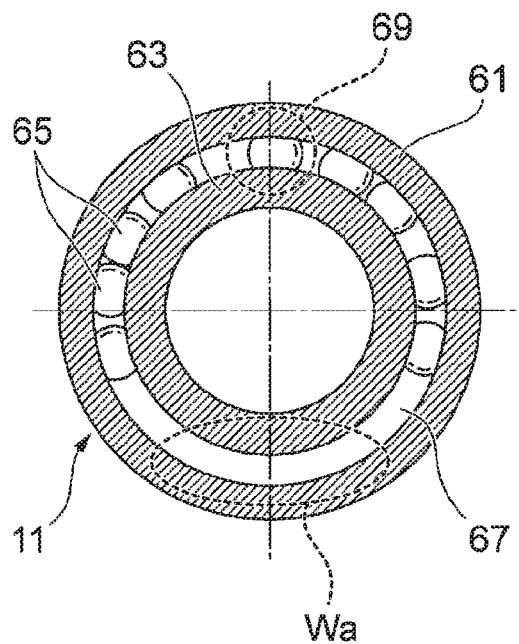
FIGS. 4A to 4D are plan views of a ball bearing, showing a ball gathering sequence in each step.
Figure 4B:
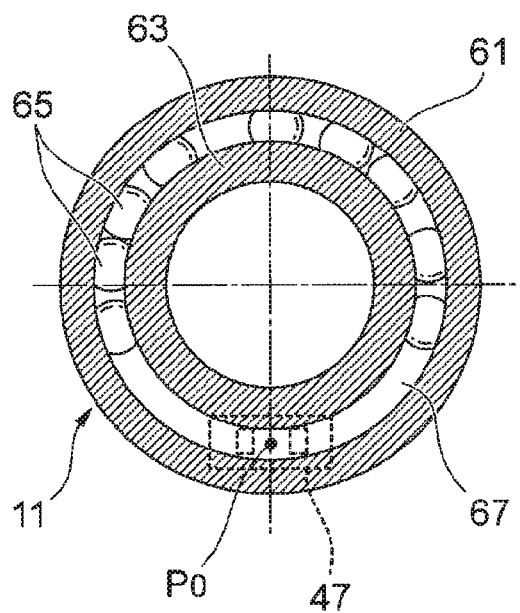

First, as shown in FIG. 1, the outer ring 61 and the inner ring 63 having the balls 65 inserted therebetween are set on the bearing support unit 13. FIG. 4A shows an initial state of the set ball bearing 11. The balls 65 are inserted from a ball insertion position 69 on the pitch circle and are randomly arranged on the pitch circle. Just after the ball insertion, the ball 65 does not exist in an area Wa in the vicinity of an 180° opposite side to the ball insertion position 69, in most cases. Therefore, as shown in FIG. 4B, the control unit 51 (refer to FIG. 3) drives the robot arm 17 to insert the claw-shaped jig 47 of the ball holding mechanism 15 into the area Wa in which the ball 65 does not exist. Specifically, the control unit fits a shaft center of the ball holding mechanism 15 to a position P0 in the area Wa on the pitch circle and inserts the claw-shaped jig 47 into the gap space 67.

At this time, the arm driving unit 53 drives the rotary shaft part 29 by the motor 37, thereby adjusting a direction (an angle θ shown in FIG. 1) of the claw-shaped jig 47 in accordance with the gap space 67. That is, the claw-shaped jig 47 is rotatively driven and adjusted such that a tangential direction of the pitch circle coincides with an arrangement direction of the pair of plate members 49A, 49B of the claw-shaped jig 47.

Figure 4C:
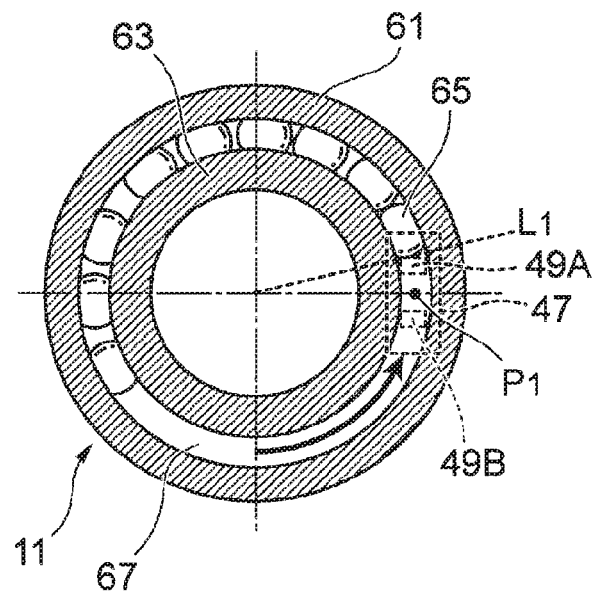

Then, as shown in FIG. 4C, the control unit 51 drives the robot arm 17 to move the claw-shaped jig 47 from the position P0 to a position P1, which is spaced from the position P0 by about 90° in a counterclockwise direction, along the pitch circle.

Thereby, the plate-shaped member 49A of a front side of the claw-shaped jig 47 in the moving direction moves on the pitch circle with pressing the ball 65 in the counterclockwise direction. When a center of the claw-shaped jig 47 reaches the position P1, one end of the ball in the gap space 67 is arranged at a circumferential position (a circumferential position of a radius line L1 in FIG. 4C) of a tip end-side of the plate-shaped member 49A in the moving direction.

Figure 4D:
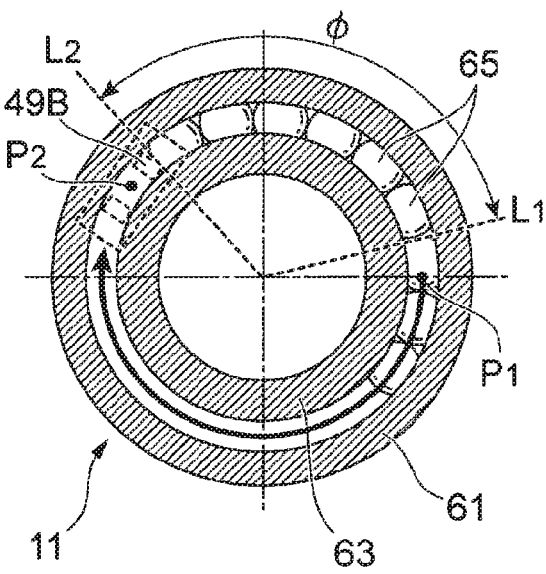

Then, the control unit 51 drives the robot arm 17 to move the claw-shaped jig 47 from the position P1 to a position P2, which is spaced from the position P1 by about 200° to 250° in a clockwise direction, along the pitch circle, as shown in FIG. 4D. At this time, the plate-shaped member 49B of a tip end-side of the claw-shaped jig 47 in the moving direction moves on the pitch circle with pressing the ball 65 in the clockwise direction. When the center of the claw-shaped jig 47 reaches the position P2, the other end of the ball in the gap space 67 is arranged at a circumferential position of a radius line L2 in FIG. 4D indicative of a circumferential position of a front side of the plate-shaped member 49B in the moving direction.

A moving amount of the claw-shaped jig 47 is set by a following relation, depending on an inner peripheral angle φ between the radius line L1 and the radius line L2 and the diameter and numbers of the balls 65.

Inner peripheral angle φ<Inner peripheral angle corresponding to a circumferential length of (ball diameter×number of balls)

That is, when the claw-shaped jig 47 is moved to the position P2 in the clockwise direction at which the inner peripheral angle φ satisfying the relation is obtained, all the balls 65 in the gap space 67 form a ball row of which the balls adjacent to each other are contacted to each other. That is, one end (a tip end in the moving direction) of the ball row moves beyond the circumferential position of the radius line L1, and the balls 65 in the gap space 67 form a lump of one ball row along the pitch circle. The ball at the other end (a rear end in the moving direction) of the ball row is arranged at the circumferential position of the radius line L2, so that the respective arrangement positions of the plurality of balls 65 are determined. The above ball gathering sequence is performed by the control program prepared in advance.

<First Ball Distribution Sequence>

Subsequently, a first ball distribution sequence which is to be performed by the ball arranging device 100 for the ball bearing is described.

Figure 5A:
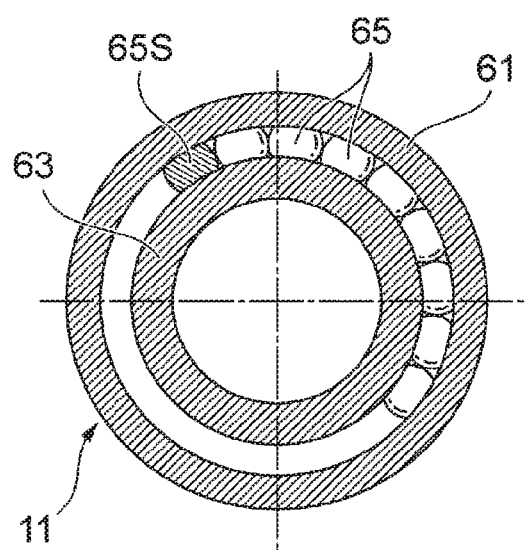
FIGS. 5A to 5D are plan views of the ball bearing, showing a ball distribution sequence in each step.
Figure 5B:
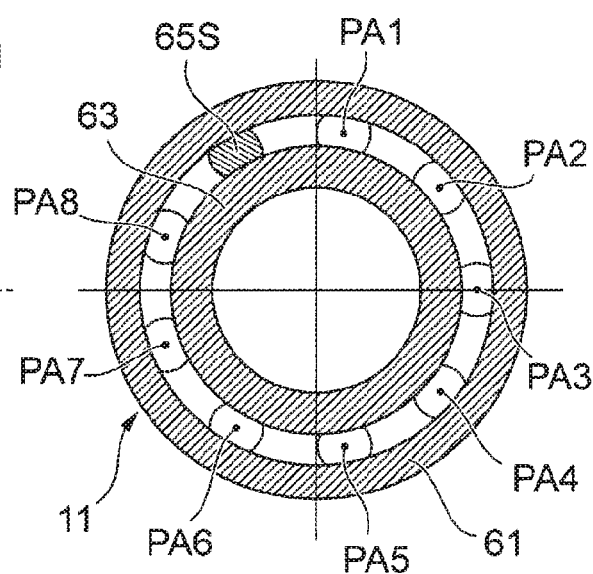

FIGS. 5A to 5D are plan views of the ball bearing, showing the ball distribution sequence in each step. FIG. 5A shows a ball-gathered state shown in FIG. 4D, in which one ball arranged at the other end of the ball row is set as an non-movable ball 65S. When it is assumed that all the other balls 65 are arranged at equally spaced intervals based on the non-movable ball 65S, the target arrangement positions of the balls 65 are as shown in FIG. 5B. That is, in the shown example, the total number of balls including the non-movable ball 65S and the other balls 65 is nine, and the target arrangement positions of the other balls 65 are positions PA1 to PA8 equally divided from the non-movable ball 65S by an inner peripheral angle of 40° on the pitch circle.

Figure 5C:
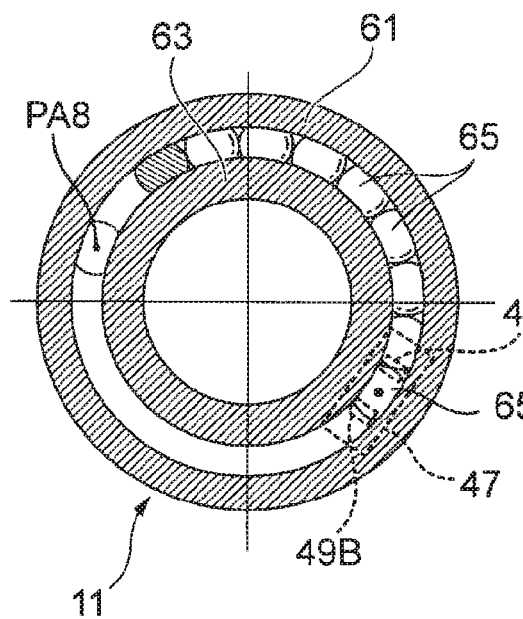

The control unit 51 (refer to FIG. 3) drives the robot arm 17 to arrange the balls at the positions PA7, PA6, PA5, • • • from the target arrangement position PA8, at which the ball next to the non-movable ball 65S is arranged, of the target arrangement positions PA1 to PA8 of the balls 65 in descending order. First, as shown in FIG. 5C, the control unit sandwiches the ball 65E most distant from the non-movable ball 65S by the claw-shaped jig 47. That is, the control unit 51 inserts the pair of plate members 49A, 49B of the claw-shaped jig 47 to both sides of the ball 65E.

Figure 5D:
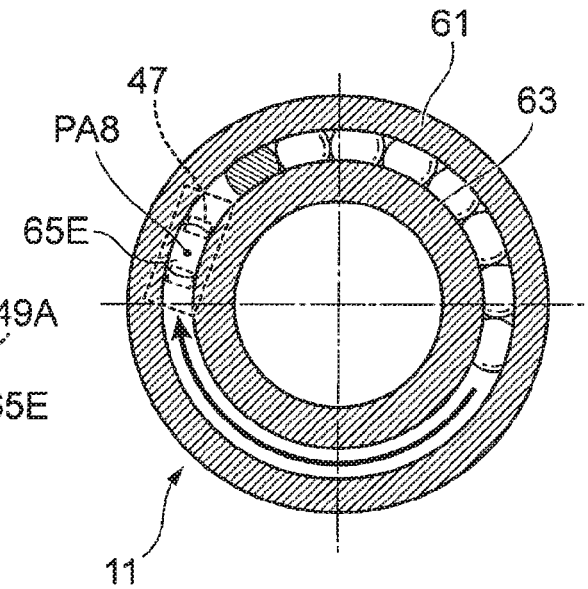

Then, the control unit 51 sandwiches the ball 65E with the pair of plate members 49A, 49B and moves the claw-shaped jig 47 to the position PA8 along the pitch circle, as shown in FIG. 5D, while adjusting the angle θ by the motor 37. Thereafter, similarly, the control unit 51 sequentially moves the other balls 65 except for the non-movable ball to the target arrangement positions PA7 to PA1. Thereby, the respective balls 65 are equally ball-distributed on the pitch circle based on the non-movable ball 65S. The above ball distribution sequence is performed by the control program prepared in advance.

Figure 6A:
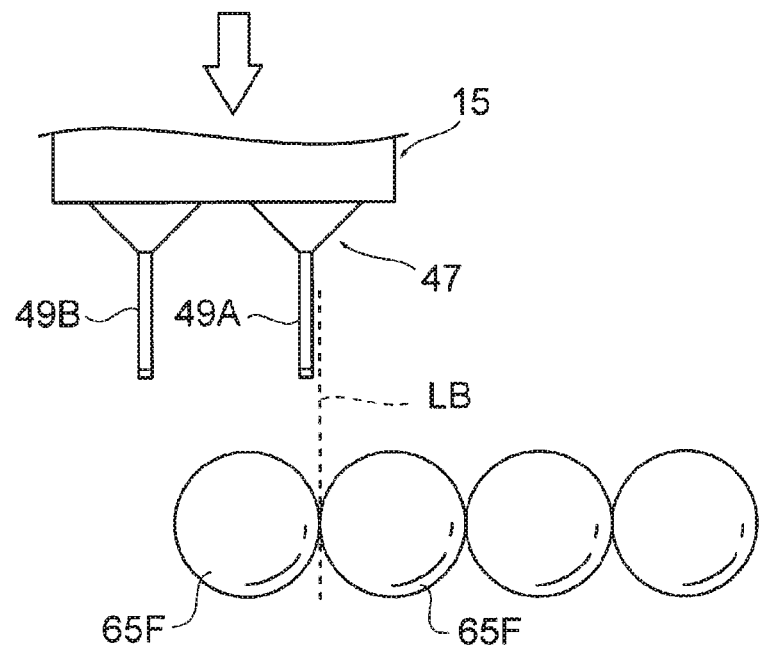
FIGS. 6A and 6B show a ball sandwiching sequence by the claw-shaped jig.
Figure 6B:
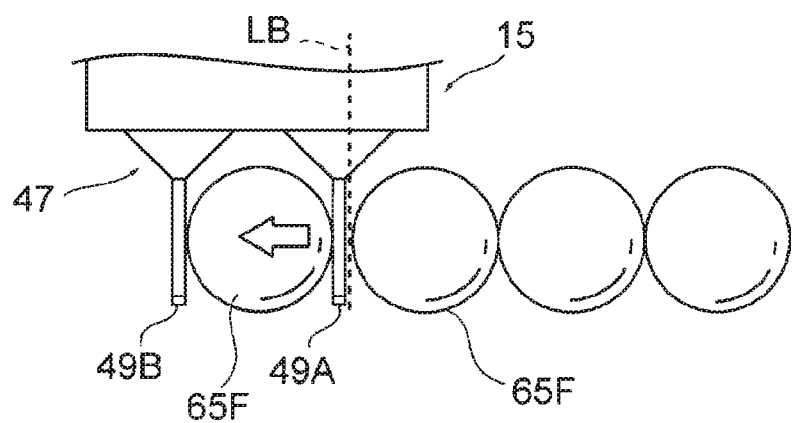

In the meantime, when sandwiching the ball 65 by the claw-shaped jig 47, a ball adjacent to the ball to be sandwiched does not positionally deviate even though the plate members 49A, 49B is inserted into the ball row. FIGS. 6A and 6B show a ball sandwiching sequence by the claw-shaped jig 47. As shown in FIG. 6A, a vertical line including a contact point between the ball 65F to be sandwiched and the ball 65G adjacent to the ball 65F is set as a vertical boundary line LB. When sandwiching the ball 65F between the plate members 49A, 49B, the plate-shaped member 49A of the claw-shaped jig 47 is arranged at a side closer to the ball 65F than the vertical boundary line LB.

When the claw-shaped jig 47 is lowered, a lower end of the plate-shaped member 49A is contacted to a spherical surface of the ball 65F. Then, as shown in FIG. 6B, the claw-shaped jig 47 is further lowered with the plate-shaped member 49A being in contact with the spherical surface of the ball 65F. Thereby, the lower end of the plate-shaped member 49A is inserted between the ball 65F and the ball 65G with sliding on the inclined surface of the ball 65F. At this time, the ball 65F is moved in a direction of separating from the adjacent ball 65G due to the sliding of the plate-shaped member 49A.

Thereby, the ball 65F is moved to between the plate members 49B and 49A and is then sandwiched therebetween as the claw-shaped jig 47 lowers. On the other hand, the ball 65G adjacent to the ball 65F is not contacted to the plate-shaped member 49A and does not deviate from the initial ball position thereof. That is, the claw-shaped jig 47 does not influence the ball position of the ball except for the ball 65F to be sandwiched.

Herein, operational effects to be achieved by the ball distribution sequence are described.

The ball arranging device 100 for the ball bearing moves the ball 65 inserted between the raceway surfaces of the ball bearing to the desired target arrangement positions by the robot arm 17. Also, even though the sizes and the numbers of balls of the bearings for which the balls are to be distributed are different, since the robot arm 17 is to be driven in accordance with the control program prepared in advance for each bearing number, it is possible to simply and correctly move the balls 65 to the target arrangement positions suitable for each bearing number. Also, the robot arm 17 of the parallel link type robot is used, so that it is possible to move the ball at higher speed.

In the conventional art, it is necessary to prepare the ball distribution jig corresponding to each bearing number. However, according to the above configuration, it is not necessary to prepare a variety of ball distribution jigs in advance, so that it is possible to save the cost of the production facility. Also, according to a method of the conventional art of preparing a variety of ball insertion jigs, it is necessary to prepare a spare jig in advance so as to immediately replace the same ball distribution jig upon occurrence of a problem. For this reason, it is necessary to secure a wide space so as to store the jigs. However, according to the above configuration, it is not necessary to prepare the spare jig, so that it is possible to save a space and to perform the production in high efficiency.

Also, when performing the ball distribution manually, a predetermined man-hour is required so as to correctly match the ball to the target position. However, for example, even when the ball is correctly arranged at the target arrangement position, the jig may contact the ball, so that the positional deviation may occur. For this reason, a retainer may be incorporated at a state where a positional deviation has occurred as to the ball, so that the damage is likely to be caused due to collision and friction between the retainer and the ball. However, according to the above configuration, it is possible to accurately move the ball, so that it is possible to prevent the ball and the retainer from being damaged.

Further, upon the change of the set, the information of the program number is input from the server 50 (refer to FIG. 3) to the control unit 51, and the control unit 51 selectively executes the control program corresponding to the name number of the bearing to be assembled. Also, according to the above configuration, it is not necessary to perform a troublesome operation of selecting a desired jig from a variety of jigs and to replace the same. Therefore, it is possible to shorten the set changing time and to reduce the takt time.

Also, the ball bearing 11 produced by the above sequences becomes an inexpensive stable product of high grade and the product performance is more constant.

<Second Ball Distribution Sequence>

Subsequently, a second ball distribution sequence which is to be performed by the ball arranging device 100 for the ball bearing is described.

In the first ball distribution sequence, the ball located at the end portion of the ball row is set as the non-movable ball. However, in the second ball distribution sequence, a ball located at a center of the ball row is set as the non-movable ball. Meanwhile, in below descriptions, the same members as the above-described members are denoted with the same reference numerals and the descriptions thereof are simplified or omitted.

Figure 7A:
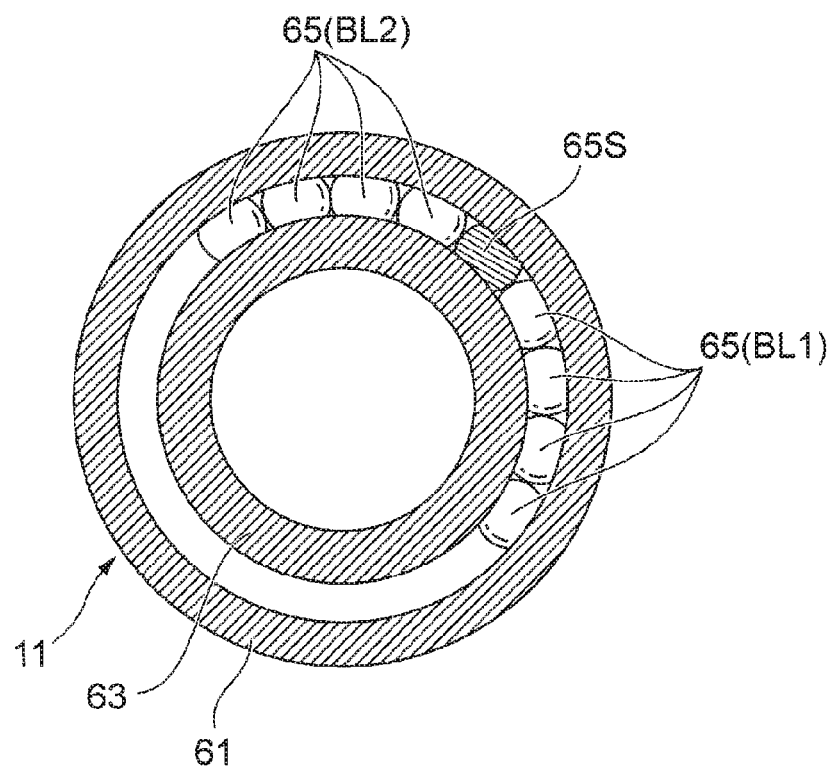
FIGS. 7A and 7B show a second ball distribution sequence.
Figure 7B:
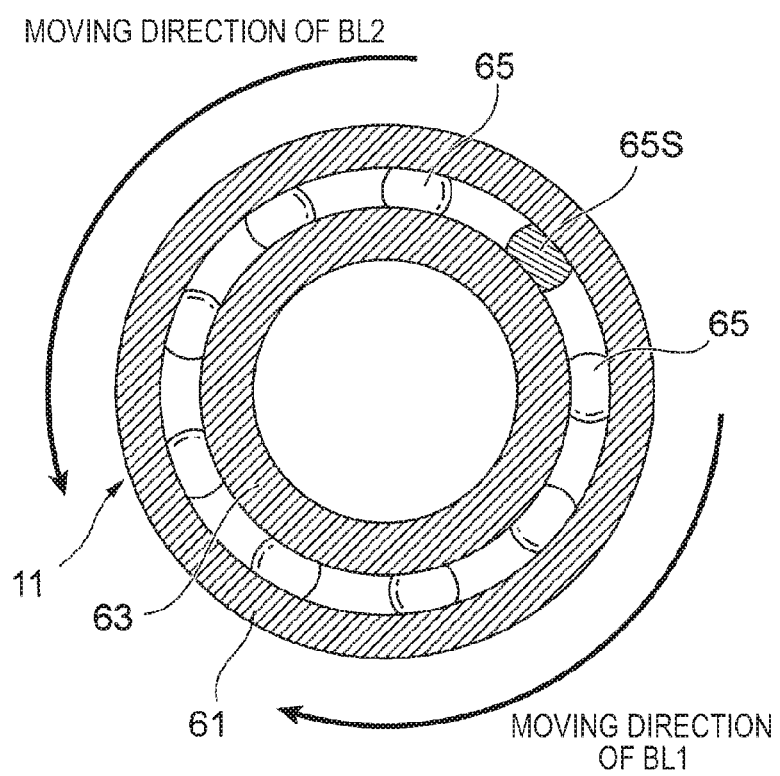

FIGS. 7A and 7B show the second ball distribution sequence. As shown in FIG. 7A, when the number of balls is an odd number, the ball located at the center of the ball row is set as the non-movable ball 65S. One ball group arranged in the clockwise direction from the non-movable ball 65S is set as a first block BL1 and the other ball group arranged in the counterclockwise direction is set as a second block BL2, so that the ball row is divided into the two blocks based on the non-movable ball 65S. In the shown example, since the number of balls is nine, the blocks each of which has the four balls are formed with the non-movable ball being arranged therebetween.

When moving the respective balls to the target arrangement positions of the balls determined in the same manner as the first ball distribution sequence, the control unit 51 moves the ball group of the first block BL1 in the clockwise direction and moves the ball group of the second block BL2 in the counterclockwise direction. Thereby, the balls 65 are equally arranged at the target arrangement positions PA1 to PA8.

According to the second ball distribution sequence, the ball row is divided into the two blocks, which are then moved. Thereby, it is possible to reduce the total moving amount of each ball 65. As a result, it is possible to shorten the cycle time of the ball distribution by the robot arm 17. Also, the moving amount is reduced, so that it is possible to suppress the damages of the balls 65 and the raceway surfaces, which are caused due to the contact of the balls 65 with the raceway surfaces between the outer ring 61 and the inner ring 63.

Figure 8:
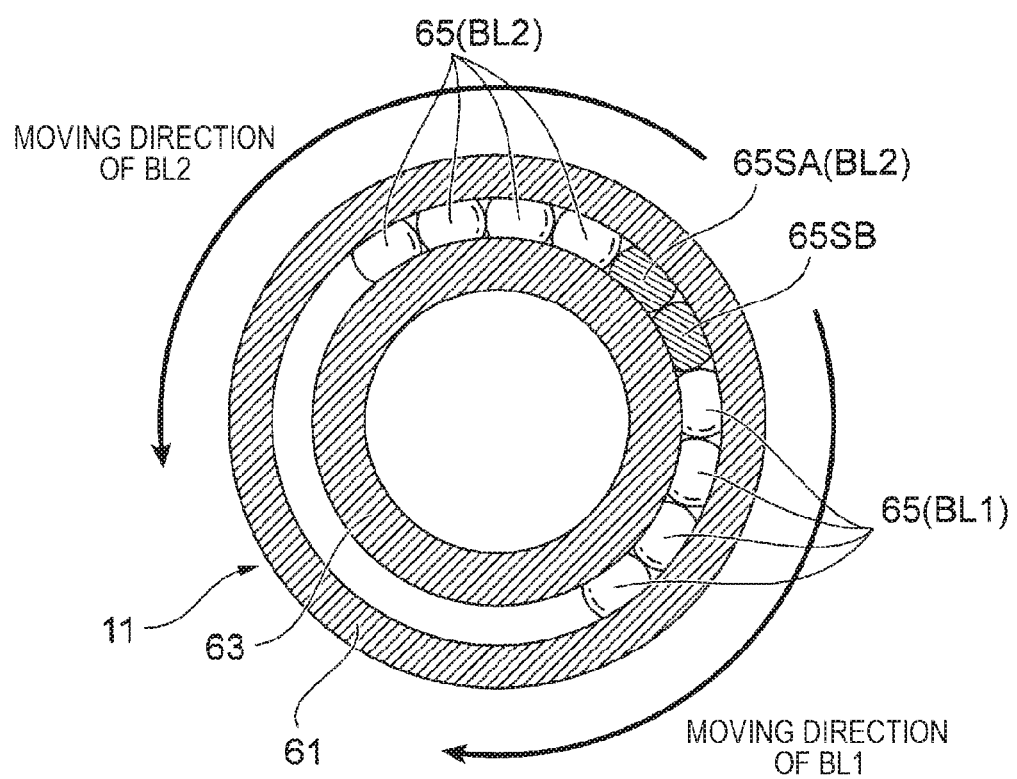
FIG. 8 shows the second ball distribution sequence when the number of balls is an even number.

FIG. 8 shows the second ball distribution sequence when the number of balls is an even number. When the number of balls is an even number, there are two balls located at the center of the ball row. One of the ball 65SA and the ball 65SB is set as a non-movable ball. The ball group which is to be arranged in the clockwise direction from the non-movable ball is set as the first block BL1 and the ball group which is to be arranged in the counterclockwise direction is set as the second block BL2, so that the ball row is divided into the two blocks. In the shown example, since the number of balls is ten, the balls 65SA, 65SB located at the center of the ball row become candidates for the non-movable ball. For example, when the ball 65SB is set as the non-movable ball, the ball 65SA is moved in the same manner as each ball 65 of the second block BL2.

The control unit 51 determines the target arrangement positions of the balls based on the set non-movable ball 65SB, according to the first ball distribution sequence, and moves each ball 65 of the first block BL1 in the clockwise direction and moves the ball 65SA and each ball 65 of the second block BL2 in the counterclockwise direction, like the case shown in FIG. 7B. Thereby, as described above, it is possible to shorten the cycle time and to suppress the damages of the balls and the raceway surfaces.

<Third Ball Distribution Sequence>

Subsequently, a third ball distribution sequence which is to be performed by the ball arranging device 100 for the ball bearing is described.

In the ball distribution sequences, the non-movable ball is set. However, in the third ball distribution sequence, the non-movable ball is not set, and all the balls are moved for ball distribution.

Figure 9A:
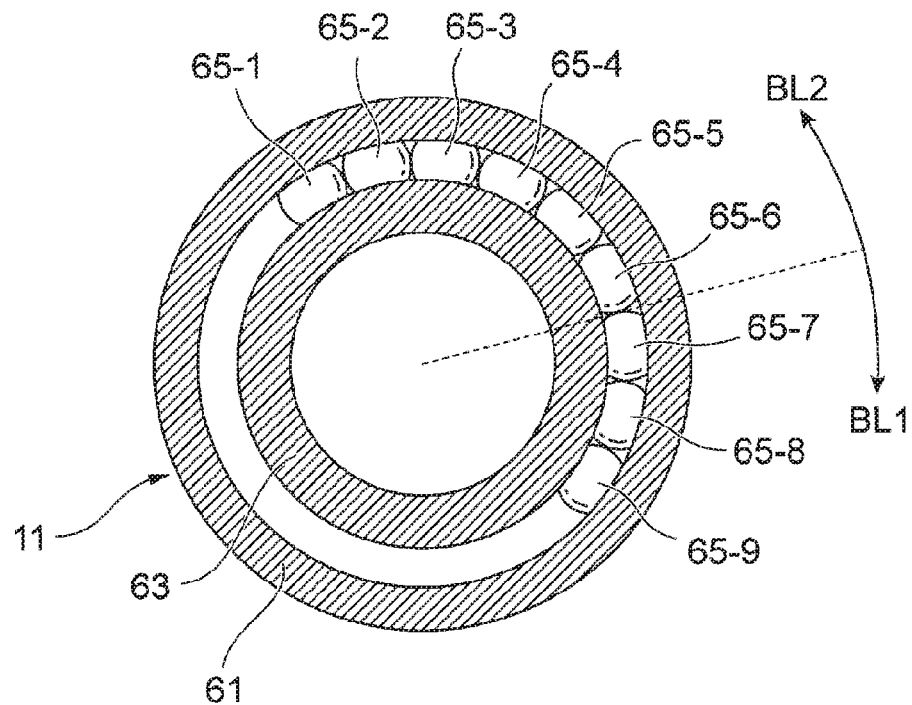
FIGS. 9A and 9B show the second ball distribution sequence when the number of balls is an even number.
Figure 9B:
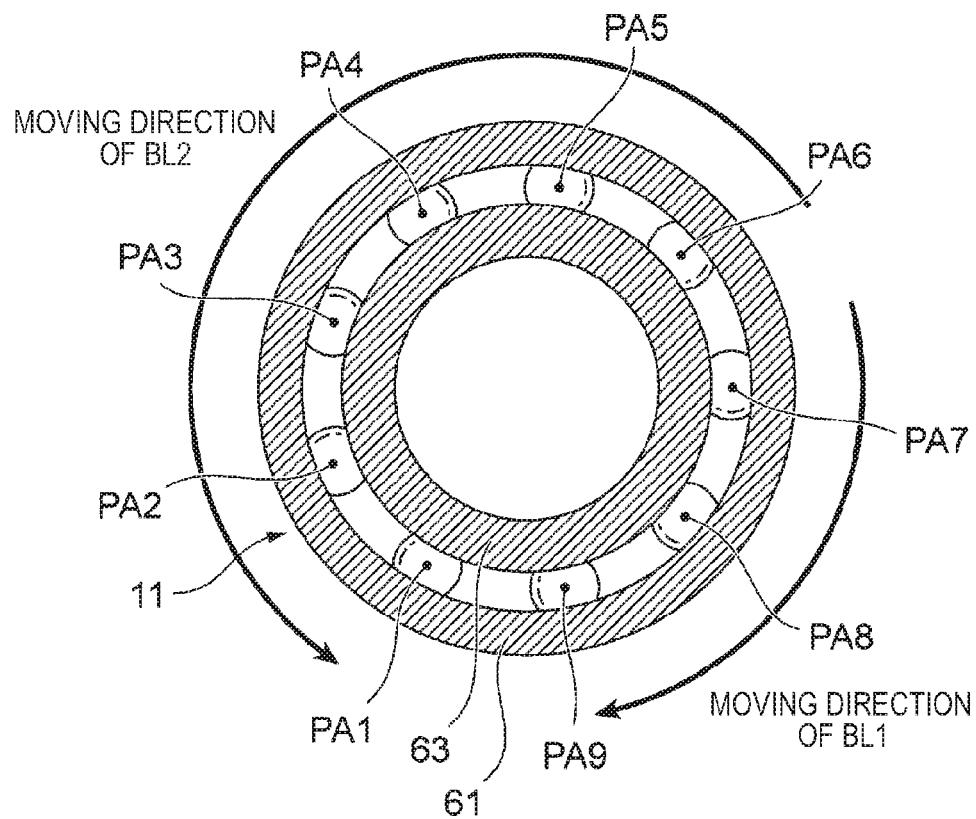

FIGS. 9A and 9B show the third ball distribution sequence when the number of balls is an even number. In the third ball distribution sequence, the balls gathered as shown in FIG. 9A are distributed to the target arrangement positions of the balls which are arbitrarily set irrespective of the non-movable ball. For example, as shown in FIG. 9A, a case where the target arrangement positions PA1 to PA9 are arbitrarily set is considered. In this case, the balls 65-1 to 65-9 and the target arrangement positions PA1 to PA9 of FIG. 9A are compared and a part between the ball 65-6 (the target arrangement position PA6) and the ball 65-7 (the target arrangement position PA7) becomes a boundary line at which the moving direction is reversed.

Therefore, the balls 65-7 to 65-9 are set as the first block BL1 and the balls 65-1 to 65-6 are set as the second block BL2, and the control unit 51 moves the balls of the first block BL1 in the clockwise direction and moves the balls of the second block BL2 in the counterclockwise direction. In this case, the moving amounts of the first block BL1 and the second block BL2 are asymmetric.

According to the third ball distribution sequence, the positions of the respective balls before the ball distribution are determined by the ball gathering operation, and the arrangement positions after the ball distribution can be arbitrarily set. For this reason, it is possible to arrange the balls at arbitrary positions, so that it is possible to improve the degree of freedom of the arrangement pattern. Also, even when the ball distribution operation is limited due to the conditions of the ball arranging device 100, such as the arrangement, the operable range and the like of the robot arm 17, for example, it is possible to perform the operation adapted to the limits of the device-side.

<First Modified Embodiment of Ball Gathering Sequence and Ball Distribution Sequence>

Subsequently, a first modified embodiment of the ball gathering sequence and the ball distribution sequence is described.

It is presumed that when implementing the ball gathering, no ball exists at the position (the area Wa) at which the pair of plate members 49A. 49B of the claw-shaped jig 47 is to be inserted into the gap space. However, in this sequence, the ball bearing is captured by an imaging unit, and when it is confirmed that there is a ball in the area Wa of the gap space, the insertion position of the pair of plate members 49A. 49B of the claw-shaped jig 47 is changed. Otherwise, the insertion position is not changed.

Figure 10:
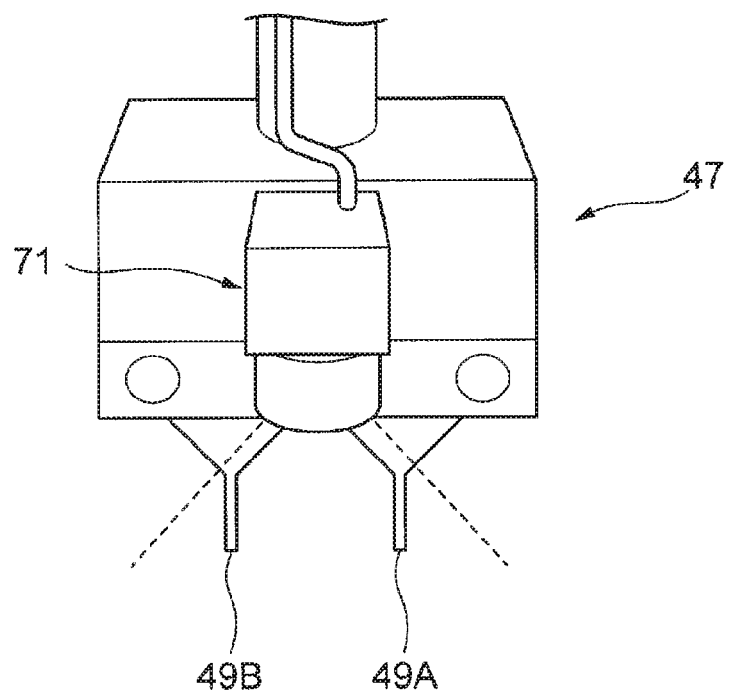
FIG. 10 is an enlarged perspective view of the claw-shaped jig, showing a manner where an imaging unit is provided at the claw-shaped jig of a tip of a robot arm.

FIG. 10 is an enlarged perspective view of the claw-shaped jig 47, showing a manner where the claw-shaped jig 47 of the robot arm tip is provided with an imaging unit. To a part of the claw-shaped jig 47, an imaging unit 71 including an imaging element, of which an imaging area is set towards the extension direction of the plate members 49A, 49B, and a lens is attached.

Figure 11:
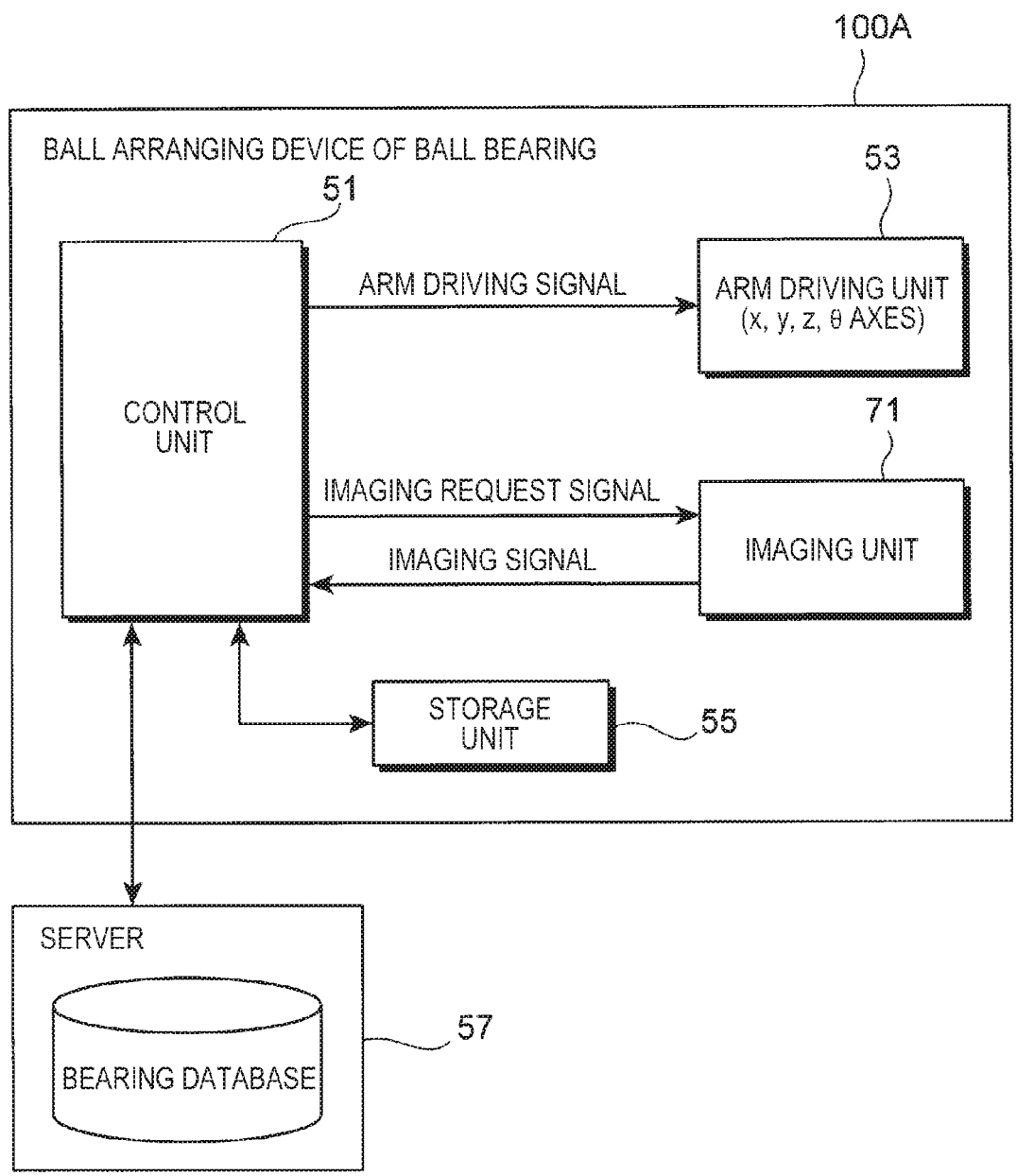
FIG. 11 is a control block diagram of a ball arranging device of a first modified embodiment.

FIG. 11 is a control block diagram of a ball arranging device 100A which implements the ball gathering sequence and the ball distribution sequence. The control unit 51 of the ball arranging device 100A outputs the arm driving signal to the arm driving unit 53 to drive the robot arm 17, thereby moving the claw-shaped jig 47 to a space above the gap space of the ball bearing. After moving the robot arm 17, the control unit 51 outputs an imaging request signal to the imaging unit 71. The imaging unit 71 having received the imaging request signal captures an area of the gap space of the ball bearing to which the pair of plate members 49A, 49B of the claw-shaped jig 47 is to be inserted and outputs an imaging signal thereof to the control unit 51.

Figure 12A:
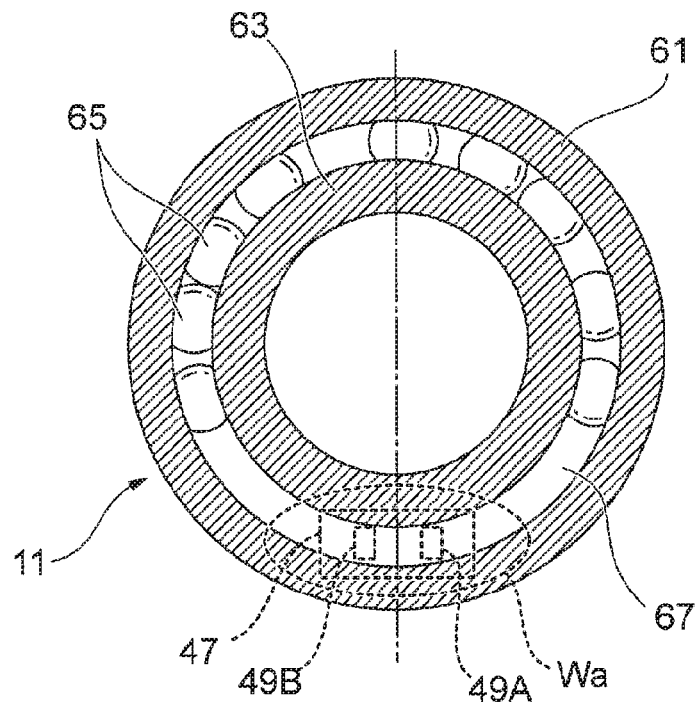
FIGS. 12A and 12B show a ball distribution sequence of the first modified embodiment.
Figure 12B:
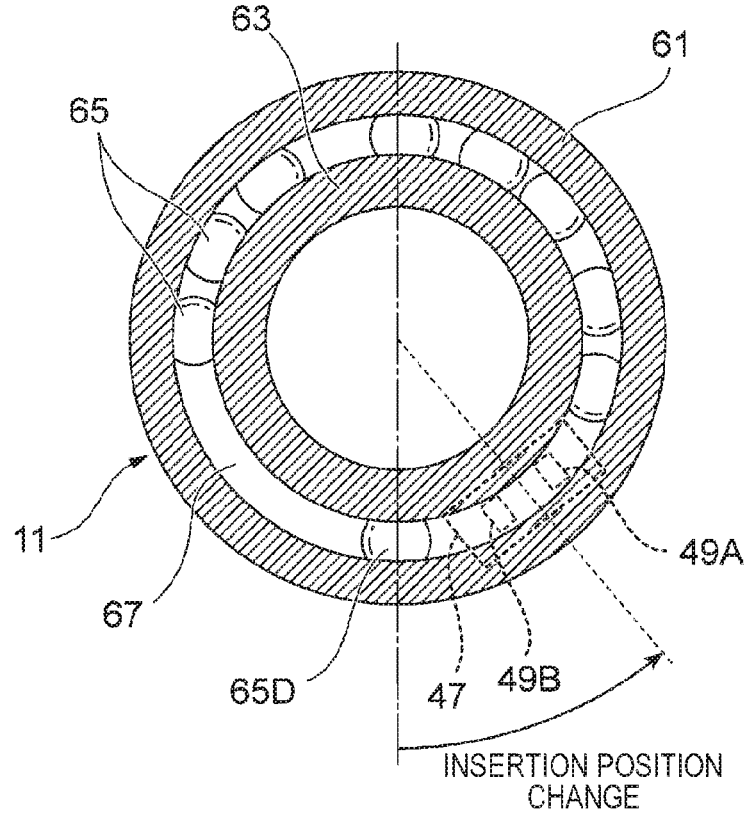

The control unit 51 performs image processing for the imaging signal output from the imaging unit 71. For example, as shown in FIG. 12A, when it is determined that there is no ball in the area Wa, the control unit 51 inserts the pair of plate members 49A. 49B of the claw-shaped jig 47 into the area Wa. On the other hand, as shown in FIG. 12B, when it is determined that there is a ball 65D in the area Wa, the control unit 51 outputs an arm driving signal for changing the circumferential position of the claw-shaped jig 47 so as to avoid the ball 65D to the arm driving unit 53, thereby changing the position of the claw-shaped jig 47.

By the above configuration, when inserting the pair of plate members 49A, 49B of the claw-shaped jig 47 into the gap space of the ball bearing, it is possible to prevent the interference with the ball more securely.

Also in the ball distribution sequence, the position of each ball is obtained from the image signal output from the imaging unit 71, so that it is possible to recognize the more correct ball position and to set a more appropriate position as a moving destination position of the claw-shaped jig 47.

<Second Modified Embodiment of Ball Gathering Sequence and Ball Distribution Sequence>

Subsequently, a second modified embodiment of the ball gathering sequence and the ball distribution sequence is described.

The above-described ball gathering sequence and the ball distribution sequence are implemented for the single-row ball bearing but can also be implemented for a double-row ball bearing. In the ball gathering sequence and the ball distribution sequence, the ball gathering and the ball distribution are performed for the balls of the double-row ball bearing by the claw-shaped jig, in the same manner as the above-described manner.

Figure 13:
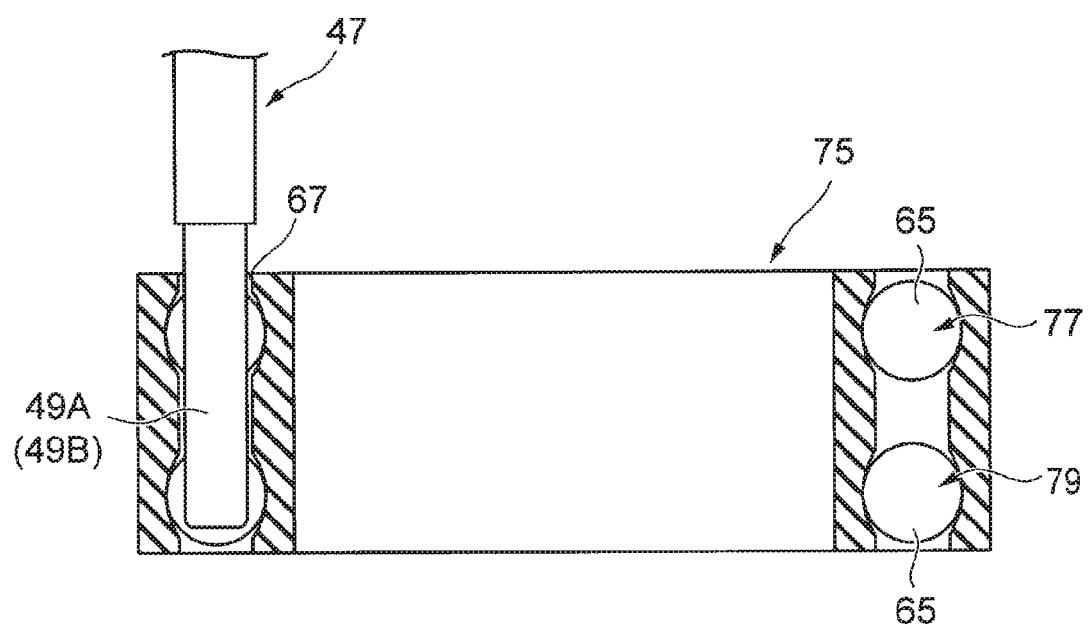
FIG. 13 is a sectional view of a double-row ball bearing.
Figure 14:
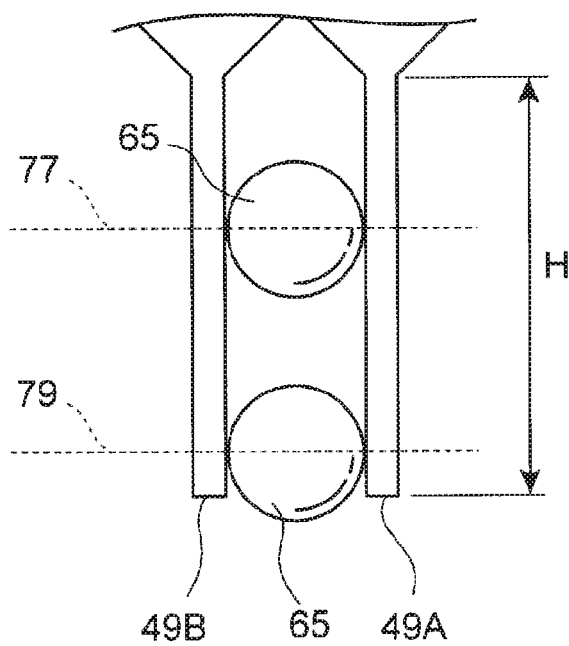
FIG. 14 shows an axial length of plate members of the claw-shaped jig.

FIG. 13 is a sectional view of a double-row ball bearing. A double-row ball bearing 75 includes a first ball row 77 and a second ball row 79, and the plurality of balls 65 are inserted in each ball row. In this case, as shown in FIG. 14, the plate members 49A, 49B of the claw-shaped jig 47 has a length at least larger than an axial length (an extension height H) between ball center positions of the ball 65 of the first ball row 77 and the ball 65 of the second ball row 79.

In this configuration, as shown in FIGS. 4A and 4B, based on the driving signal from the control unit 51, the arm driving unit 53 first inserts the plate-shaped member 49A, 49B into the area Wa of the gap space 67 of the double-row ball bearing 75, and as shown in FIGS. 4C and 4D, the ball 65 of the first ball row 77 and the ball 65 of the second ball row 79 are gathered at once. When the ball gathering is completed, the circumferential positions of the ball 65 of the first ball row 77 and the ball 65 of the second ball row 79 coincide with each other.

Then, the arm driving unit 53 inserts the pair of plate members 49A, 49B in the axial direction of the double-row ball bearing 75 at positions at which the two balls of the ball 65 of the first ball row 77 and the ball 65 of the second ball row 79 arranged to axially overlap with each other after the ball gathering are all sandwiched between the plate members 49A, 49B. Thereby, the two balls 65, 65 are sandwiched by the plate members 49A, 49B.

Then, the control unit 51 drives the robot arm 17 in the same manner as the above-described embodiment, so that the two balls of the ball 65 of the first ball row 77 and the ball 65 of the second ball row 79 are sandwiched at the same time and are moved at once to the target arrangement positions. The above sequences are repeated, so that the ball gathering and the ball distribution can be performed, similarly to the case of the single-row ball bearing.

<Other Configuration Examples>

Figure 15:
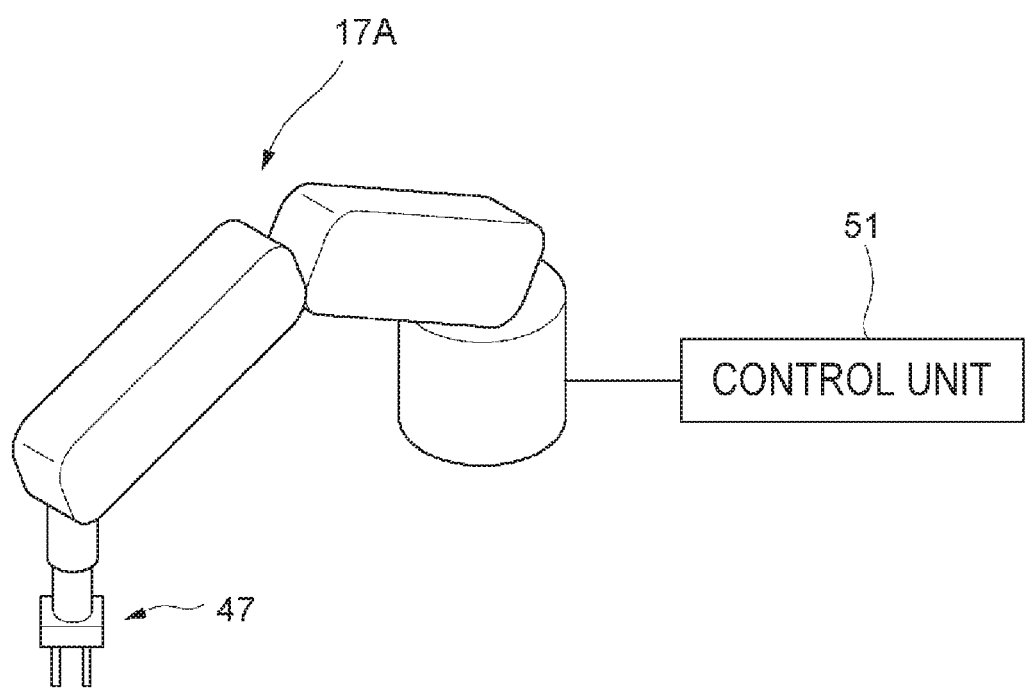
FIG. 15 is a perspective view showing a robot arm of a multiple joint mechanism.
Figure 16:
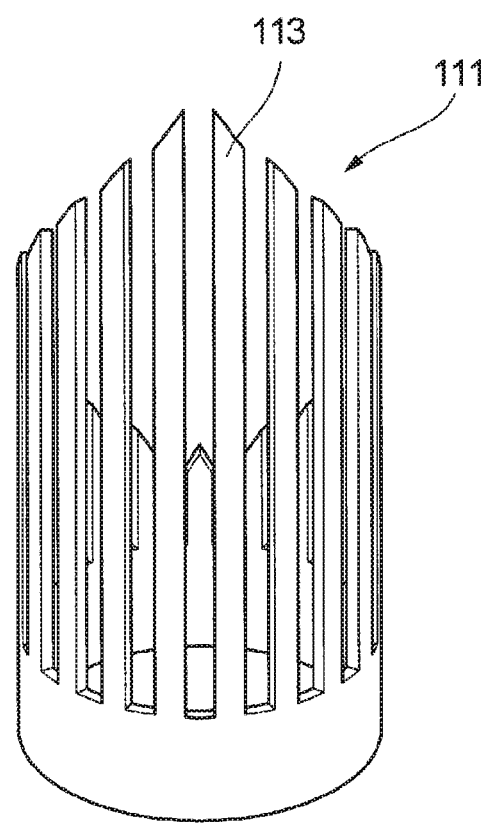
FIG. 16 is a perspective view of a ball distribution arrow.
Figure 18A:
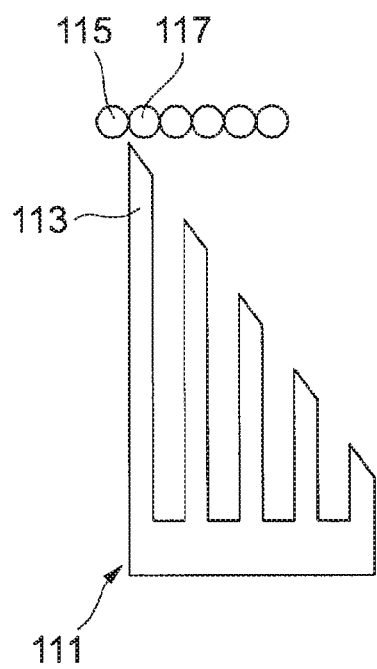
FIGS. 18A to 18C show a manner where a deviation occurs between rising timing of the ball distribution arrow and a position of a ball.
Figure 18B:
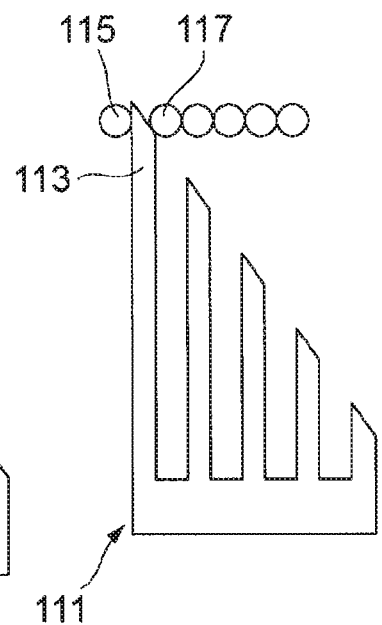
Figure 18C:
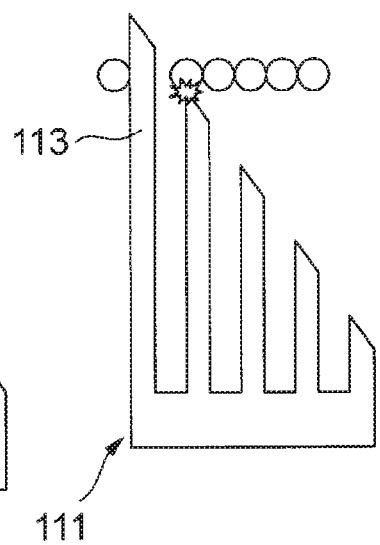

As the robot arm 17 which is to be used for the ball arranging device 100 for the ball bearing, a variety of mechanisms can be adopted, in addition to the robot arm 17 of the parallel link type shown in FIG. 1. For example, a robot arm 17A of a multiple joint mechanism shown in FIG. 15 may also be used. In this case, a tip of the robot arm 17A is provided with the claw-shaped jig 47 for sandwiching and moving the ball. As another robot arm, a single shaft robot or an orthogonal robot configured by orthogonal slide shafts of two shafts or three shafts, and the like may be adopted.

<Effects of Reduction in Ball Distribution Error and Ball Damage by Present Invention>

A test result about the effects of reduction in the ball distribution error and the ball damage by the present invention is described.

According to the ball distribution by the present invention, the occurrence ratios of the ball distribution error and the ball damage are all reduced. As shown in Table 2, it can be seen that the occurrence ratios decreased from the number of balls of 13 or more and the remarkable difference occurred from the number of balls 20 or more, as compared to a reference example where the ball distribution is performed using the ball distribution arrow.

TABLE 2

|  |  | Number of balls | | | | | |
|---|---|---|---|---|---|---|---|
|  |  | 3 to 8 | 9 to 12 | 13 to 16 | 17 to 19 | 20 to 24 | 25 or more |
| Reference example | Ball damage | A | A | B | B | C | C |
|  | Ball distribution error | A | A | A | B | C | D |
| Present configuration | Ball damage | A | A | A | A | A | A |
|  | Ball distribution error | A | A | A | A | A | A |

A: little occurred (occurrence ratio: 0.1% or less)
B: rarely occurred (occurrence ratio: 0.1% to 0.3%)
C: regularly occurred (occurrence ratio: 0.3% to 1.0%)
D: frequently occurred (occurrence ratio: 1.0% or greater)

The present invention is not limited to the embodiments, and combinations of the respective configurations of the embodiments and changes and modifications made by one skilled in the art based on the specification and the well-known technology are also included within the scope of the present invention to be protected. For example, the ball holding mechanism 15 is not necessarily required to sandwich the rolling element by the claw-shaped jig 47 and may hold the rolling element by vacuum-suctioning or electro-magnetically suctioning the same.

The present invention is based on a Japanese Patent Application No. 2014-186214 filed on Sep. 12, 2014, the content of which is herein incorporated by reference.

DESCRIPTION OF REFERENCE NUMERALS

11: ball bearing
15: ball holding mechanism
17: robot arm
47: claw-shaped jig
49A, 49B: plate-shaped member
51: control unit
53: arm driving unit
61: outer ring
63: inner ring
65: ball
65S: non-movable ball
67: gap space
75: double-row ball bearing
77: first ball row
79: second ball row
100: ball arranging device

The invention claimed is:

1. A ball arranging method for a ball bearing to arrange a plurality of balls inserted in a gap space between an outer ring raceway surface and an inner ring raceway surface at equally spaced intervals along a ball pitch circle, wherein:
   a ball holding step of holding any ball of the plurality of balls in the gap space by a pair of plate members arranged at a tip of a robot arm and arranged in parallel with a gap having substantially same width as a diameter of the ball, and
   a ball moving step of moving the ball, while the ball is held by the pair of plate members therebetween, along the pitch circle by driving the robot arm, wherein
   the ball holding step and the ball moving step are repeatedly performed based on a control program such that the plurality of balls are arranged at equally spaced target arrangement positions, and
   during the ball moving step, the ball that is moved is held directly between the pair of plate members such that a first side of the ball is directly adjacent to and facing one of the plate members in the pair of plate members and a second side of the ball, opposite of the first side, is directly adjacent to and facing the other of the plate members in the pair of plate members.

2. The ball arranging method according to claim 1, wherein before performing the ball holding step and the ball moving step, a ball gathering step of causing the plurality of balls to contact each other along the pitch circle to form a ball row is performed.

3. The ball arranging method according to claim 2, wherein one of the plurality of balls is set as a non-movable ball which is not moved, and balls other than the non-movable ball are moved along the pitch circle.

4. The ball arranging method according to claim 2, wherein the ball row is divided into two blocks, balls in one block are moved in a clockwise direction and balls in the other block are moved in a counterclockwise direction.

5. The ball arranging method according to claim 1, wherein the ball bearing is a double-row ball bearing including a first ball row and a second ball row,
   wherein the pair of plate members has a length at least larger than an axial length between center positions of a ball of the first ball row and a ball of the second ball row which overlap in an axial direction, and wherein a ball of the first ball row and a ball of the second ball row which overlaps with each other in the axial direction are held by the pair of plate members at the same time to be moved along the pitch circle.

6. The ball arranging method according to claim 1, wherein during the ball moving step, the ball is moved while the pair of plate members move along the ball pitch circle in a same direction.

7. The ball arranging method according to claim 1, during the ball moving step, the ball is moved while the pair of plate members move along the ball pitch circle with a fixed distance between the pair of plate members.

8. A ball arranging device for a ball bearing to arrange a plurality of balls inserted in a gap space between an outer ring raceway surface and an inner ring raceway surface of the ball bearing at equally spaced intervals along a ball pitch circle, the device comprising:
a bearing support unit which supports the ball bearing;
a ball holding mechanism which releasably holds any ball of the plurality of balls in the gap space;
a robot arm which includes a tip arranged with the ball holding mechanism; and
a control unit which drives the robot arm and the ball holding mechanism based on a control program,
wherein the ball holding mechanism includes a base member attached to the tip of the robot arm, and a pair of plate members fixed to the base member, such that the pair of plate members are arranged in parallel and fixed relative to each other with a fixed gap there between having substantially same width as a diameter of the ball, and sandwiching the ball between the pair of plate members,
wherein the control unit controls the ball holding mechanism to hold any ball of the plurality of balls in the gap space and controls the robot arm to move the ball, while the ball is held directly between the pair of plate members and the fixed gap between the plate members is maintained, along the ball pitch circle,
wherein the control unit is configured to repeatedly control, based on the control program and while the fixed gap between the plate members is maintained, the ball holding mechanism to hold any ball of the plurality of balls in the gap space, and the robot arm to move the ball, while the ball is held directly between the pair of plate members, such that the plurality of balls are arranged at equally spaced target arrangement positions, and
wherein the control unit is configured to control the robot arm to hold the ball, while the ball is moved and the fixed gap is maintained, such that a first side of the ball is directly adjacent to and facing one of the plate members in the pair of plate members and a second side of the ball, opposite of the first side, is directly adjacent to and facing the other of the plate members in the pair of plate members.

9. The ball arranging device according to claim 8, wherein the ball bearing is a double-row ball bearing including a first ball row and a second ball row, and
wherein the pair of plate members has a length at least larger than an axial length between center positions of a ball of the first ball row and a ball of the second ball row which overlap in an axial direction.

10. The ball arranging device according to claim 8, wherein the control unit is configured to control the robot arm to move the pair of plate members along the ball pitch circle in a same direction while the ball is simultaneously held and moved.

11. The ball arranging device according to claim 8, wherein the control unit is configured to control the robot arm to move the pair of plate members along the ball pitch circle with a fixed distance between the pair of plate members while the ball is simultaneously held and moved.

12. A method comprising:
a providing step of providing an inner ring inside an outer ring to form a gap space between an inner ring raceway of the inner ring and an outer ring raceway of the outer ring;
an inserting step of inserting a plurality of balls in the gap space between the inner ring raceway and the outer ring raceway;
a ball holding step of holding any ball of the plurality of balls in the gap space by a pair of plate members arranged at a tip of a robot arm and arranged in parallel with a gap having substantially same width as a diameter of the ball; and
a ball moving step of moving the ball, while the ball is held by the pair of plate members therebetween, along a ball pitch circle by driving the robot arm, wherein
the ball holding step and the ball moving step are repeatedly performed based on a control program such that the plurality of balls are arranged at equally spaced target arrangement positions along the ball pitch circle, and
during the ball moving step, the ball that is moved is held directly between the pair of plate members such that a first side of the ball is directly adjacent to and facing one of the plate members in the pair of plate members and a second side of the ball, opposite of the first side, is directly adjacent to and facing the other of the plate members in the pair of plate members.

* * * * *